Feb. 24, 1970  C. L. BEECK  3,497,119
REFUSE CONTAINER FOR MOTOR VEHICLE BODY
Filed Feb. 20, 1968  2 Sheets-Sheet 1
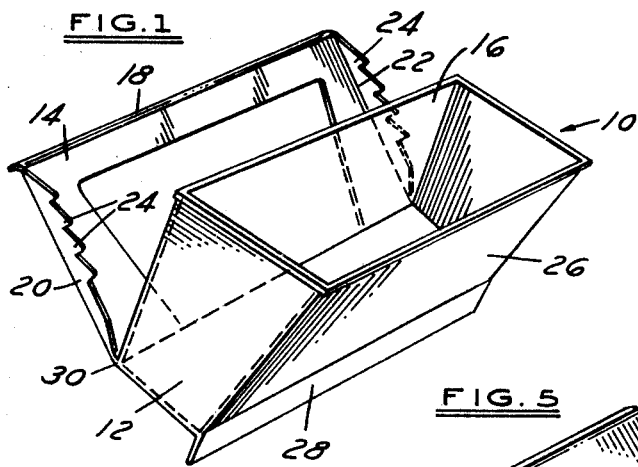
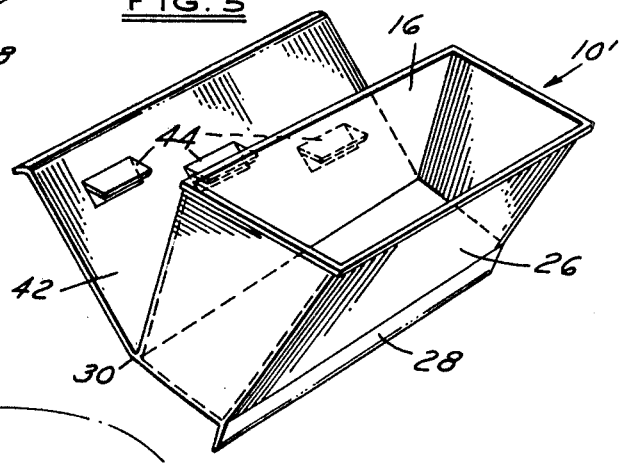
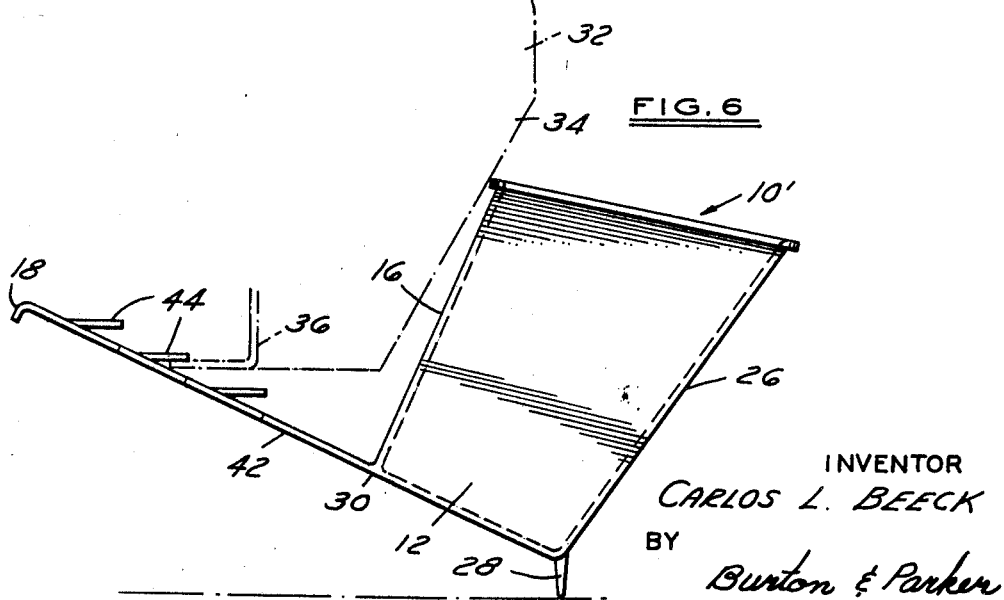
INVENTOR
CARLOS L. BEECK
BY
Burton & Parker
ATTORNEYS Feb. 24, 1970
C. L. BEECK
3,497,119
REFUSE CONTAINER FOR MOTOR VEHICLE BODY
Filed Feb. 20, 1968
2 Sheets-Sheet 2
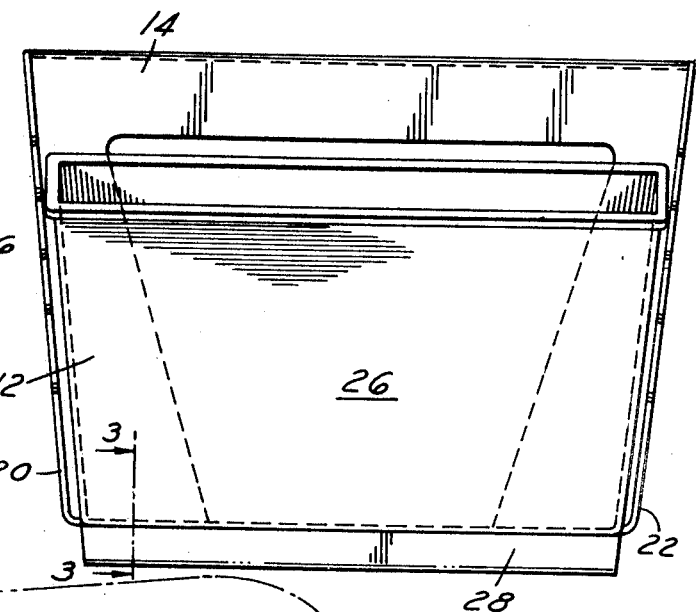
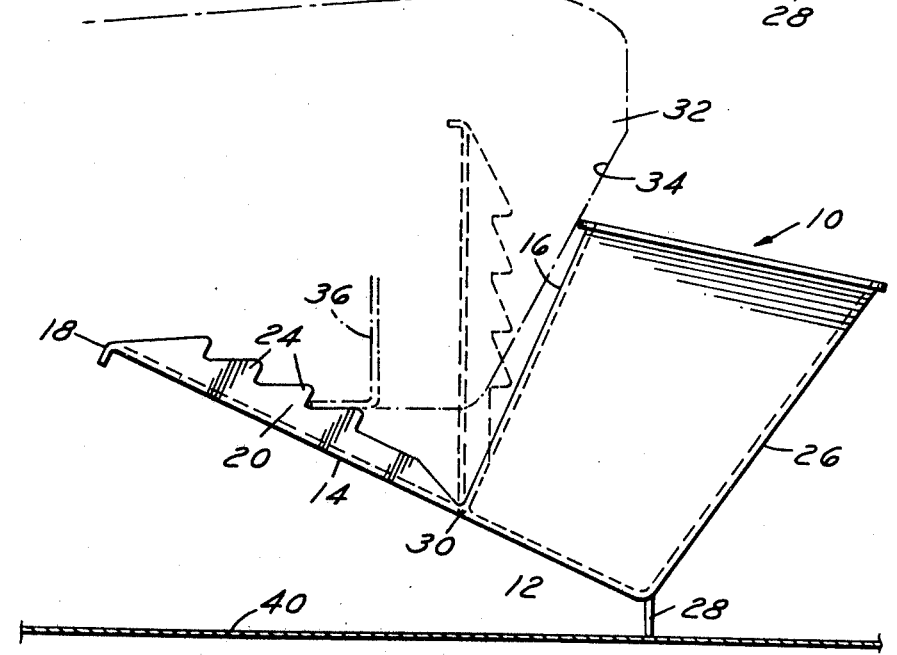
INVENTOR
CARLOS L. BEECK
BY
*Burton & Parker*
ATTORNEYS

United States Patent Office 3,497,119
Patented Feb. 24, 1970

3,497,119
REFUSE CONTAINER FOR MOTOR VEHICLE BODY
Carlos L. Beeck, 901 Aleppo St.,
Newport Beach, Calif. 92660
Filed Feb. 20, 1968, Ser. No. 706,916
Int. Cl. B60n *3/08;* B60r *7/04*
U.S. Cl. 224—29                                         5 Claims

ABSTRACT OF THE DISCLOSURE

A container comprising a box-like receptacle having bottom and side walls and open at the top, with a resilient flap member secured to the receptacle adjacent a lower marginal edge thereof, the flap being biased toward a side wall of the receptacle. The container is designed to be positioned adjacent the front edge of a seat of a motor vehicle body for reception of the usual car litter such as facial tissues, empty cigarette packages, and the like and/or other small articles which are used by the occupants of the vehicle, such as sunglasses, cigarettes, pencils, food, etc. The resilient flap member of the receptacle is adapted to project under the front lower edge of the vehicle seat to retain the receptacle against the front surface of the seat so that the latter is releasably held in a position contacting the lower portion of the front of the vehicle seat and the vehicle floor board, actually being wedged therebetween, tucked away under the legs of the person sitting on the seat. As the lower front portion of the vehicle seat generally slants rearwardly, the receptacle is in effect tucked in underneath the leading upper edge of the seat, disposing it out of the way of the vehicle occupants, either when sitting on the seat or when entering or leaving the vehicle.

BACKGROUND OF THE INVENTION

The invention pertains to receptacles, particularly that class of receptacles designed for use in motor vehicles to contain various items which are used by the occupants of the vehicle, and also trash or other car litter such as waste paper and the like. If a suitable receptacle is not provided for the disposal of litter and waste, such is often discarded from the vehicle to clutter the highways, or is disposed of inside the vehicle, resulting in an unsightly mess on the vehicle floor, seats and dashboard. Many devices have been proposed to contain articles used by occupants of motor vehicles and trash or refuse accumulated by such persons. The greatest activity has been in the area of providing a bag or the like made out of plastic (or paper in the case of disposable bags), together with some means of removably mounting the bag within the vehicle. The mounting means provided have included various clips, magnets, and pressure sensitive tapes for affixing the bags to or under the vehicle dashboard, or apertures in the bag to enable it to be hung up on a door handle or control knob within the vehicle.

While these bag devices have been extensively used in automobiles, they have not proved entirely satisfactory, largely for the reasons that they are unsightly and are usually hung from a portion of the vehicle body so that irregular movement of the vehicle as from starting, stopping and cornering causes the bags to swing back and forth. In addition, unless some means of holding the bag in an open position is provided, access is difficult, and the trash or refuse winds up on the floor instead of in the bag.

Other prior art devices have been in common use which include a rigid container or receptable provided with weighted flexible flaps secured to the bottom of the receptacle to retain the container in a generally upright position when positioned on the tunnel hump of the motor vehicle with the flaps draping over the opposite sides of the tunnel. This type of device is exemplified most aptly by United States Patents Nos. 3,109,537 and 3,285,398. The refuse containers incorporating a substantially rigid receptacle mounted on a saddle-like base draping over the tunnel hump have proved to be much more satisfactory than the bag-like devices variously secured to the vehicle body as the above indicated. It is well recognized that the indiscriminate disposal of trash and refuse along the nation's highways creates many problems, not the least of which are vehicle safety hazards, unsightliness, and the monumental cost of removal of the litter from the roadways.

The instant invention is a step forward over the prior art devices which have been employed in that it provides a simple and inexpensive container for refuse or small articles, which container is positioned in the vehicle out of the way of its occupants and generally out of sight of the occupants, yet is easily accessible for the deposit of articles therein. It is removably mounted in the vehicle in such a manner as to preclude accidental dislodgement during even the most violent movement of the vehicle, say from a collision.

In the drawings:

FIG. 1 is a perspective view of a refuse container embodying the invention;

FIG. 2 is a front elevation of the refuse container shown in FIG. 1;

FIG. 3 is a partial cross sectional view, taken along line 3—3 of FIG. 2;

FIG. 4 is an end elevation of the receptacle showing it in actual "in use" position in a motor vehicle;

FIG. 5 is a perspective view of a refuse container similar to FIG. 1 showing a slightly modified construction; and FIG. 6 is an end elevation of the receptacle shown in FIG. 5 showing the device installed in the motor vehicle.

In the drawings, there is shown a refuse container embodying my invention, generally indicated by the numeral 10. Such comprises a box-like receptacle 12 having opposed pairs of side walls, a bottom wall, and open at the top. Obviously, if so desired, the receptable 21 could be provided with a cover which could be hingedly or removably secured to the top of the receptacle.

Affixed to the receptacle 12 along the lower marginal edge of one side wall thereof is a resilient flap 14 which may be formed in an inverted U shape, with the ends of the legs of the U secured to the receptacle 12, as shown most clearly in FIG. 1. The flap 14 is preferably formed integral with the receptacle 12, and is resiliently biased toward the side wall 16 of the box-like receptacle to which it is secured. Preferably the flap 14 is provided with a longitudinal marginal edge 18 which is slightly curved to facilitate installation of the refuse container in the motor vehicle. Opposite lateral marginal edges of flap 14 are provided with upstanding flange portions 20 and 22 which project toward the receptacle side wall, each flange being provided with a series of tooth-like projections or serrations 24, the purpose of which will be more fully described hereinafter.

Secured to the lower marginal edge of the side wall 26 of receptacle 12 is a downwardly extending foot member 28 which is substantially rigid in comparison to the somewhat flexible, resilient flap member 14. The foot member 28 is of minimal height, and may extend entirely along the lower marginal edge of the receptacle wall 26, although it could be made discontinuous. As can be seen from the drawings, the foot member 28 depends from the side wall 26 of the receptacle which is opposite the receptacle side wall 16 to which the flap 14 is secured.

As stated, the refuse container is preferably of integral construction, the receptacle 12, flap 14, and foot 28 being formed in a single piece. Such may be formed of any convenient material such as plastic, metal or the like, but it has been found that plastic is probably best suited for such a construction. Irrespective of the particular material used, the receptacle should be light in weight and of quite rugged construction to obviate any problem of breakage during use. By utilizing a plastic material for the container, it may be conveniently molded in one piece, and the hinge connection between the receptacle 12 and the flap 14 shown at 30 in FIG. 3 will have the requisite resiliency and springiness required for this particular application.

During fabrication, the flap 14 is manufactured so as to extend from its point of securement 30 upwardly along the adjacent side wall 16, being disposed fairly close to said side wall, as indicated in dotted outline 14' in FIG. 4. Thus the flap 14 is deflected away from the receptacle side wall 16 during installation in the motor vehicle, and the natural tendency of the flap to return to its original position places the flap in tension, thus biasing the receptacle against the forward end of the vehicle seat.

In FIGS. 4 and 6, there is indicated in phantom outline at 32 a conventional vehicle seat, such seat having a generally downwardly and rearwardly extending front surface portion 34 which terminates in the underside of the seat in a horizontal structural support member shown at 36. The floorline of the vehicle body is indicated at 40 in FIGS. 4 and 6.

Referring to FIG. 4, the container 10 is installed in the motor vehicle by bending the flap 14 away from the receptacle portion 12, and then sliding the flap 14 underneath the vehicle seat 32 and pushing the receptacle 12 toward the seat until the upper marginal edge of the side wall 16 contacts the forward edge 34 of the seat, and the foot member 28 is in intimate frictional engagement with the floor 40. In this position, one of the projections 24 hooks underneath the structural seat member 36 to retain the container in the position shown in solid outline in FIG. 4.

As the flap member 14 is tensioned toward the wall 16 of the receptacle on its pivot or hinge point 30, the receptacle is urged against the forward surface of the seat 34 and the flap flanges 20 are tensioned against the member 36 to assist in preventing accidental dislodgement of the receptacle from its installed position. The foot 28 also assists in retaining the container 10 in position, as when the flap 14 and receptacle 12 are in the positions above described, the receptacle is, in effect, wedged into this position between the seat and the floor due to the contact between the upper marginal edge of wall 16 against the seat and the frictional engagement of the foot 28 with the floor 40.

In FIGS. 5 and 6 there is shown a slightly modified construction of a refuse container generally indicated by the numeral 10'. The only difference between such construction and that previously described with reference to FIGS. 1 through 4 lies in the provision of a slightly different construction for the flap which is indicated in FIGS. 5 and 6 by the reference numeral 42. As can be seen from such figures the flap member 42 is an essentially planar sheet-like member integral with the receptacle 12 and hingely connected thereto at 30, the flap having a plurality of generally rectangular projections 44 struck from the plane of the flap 42 itself. The projections 44 may be very simply and easily provided by suitable cuts in the flap leaving one edge portion of the cut-outs to form a hinge for bending the cut portions out of the plane of the flap as shown. Of course, the portions 44, while shown as rectangular, could be of any other suitable shape as desired.

As shown in FIG. 6, the flap portions 44 operate in much the same manner as the projections 24 on the flap 14 previously described with reference to FIGS. 1 through 4. The container 10' is installed in the automobile adjacent the seat thereof in the same fashion as that above described, and the selected projecting portion 44 is hooked over the structural support member 36 of the seat to prevent dislodgement of the container from its position. It will be understood that the flap member 42 is constructed so as to assume a normal untensioned position as shown at 42' similar to the position of the flap of FIGS. 1 through 4 at 14' in FIG. 4.

In order to remove the refuse containers 10 and 10' from their installed positions as shown in FIGS. 4 and 6 respectively, all that is necessary is to dislodge the engagement of flap portions from the member 36, and slide the flap out from underneath the seat, such being accomplished by slight rearward movement of the receptacle and then movement counterclockwise as shown in FIGS. 4 and 6 to disengage the flap projections from the seat underside and extricate the flap from underneath the seat. Thus, while the container may be easily and conveniently fixed against dislodgement in the motor vehicle it may be conveniently removed for emptying and/or cleaning in a matter of seconds without the use of any tools whatsoever.

The construction as above described results in a versatile device for containing refuse and small articles which can be used in virtually all of the passenger type automobiles on the road today. While the height of the underside of the vehicle seat above the floor varies widely among the different makes of automobiles, the seat-engaging flap of the refuse container is constructed to be adaptable to wide variations in these vehicle dimensions.

What is claimed is:

1. A refuse container for removable support upon the floor of a motor vehicle body comprising a box-like receptacle having a top opening, an integral flap member joined to a lower marginal edge of the receptacle by a resilient hinge portion biasing the flap toward a side wall of the receptacle, said flap adapted to project under the vehicle seat for engagement against the underside of the seat and exhibiting at least one projection displaced from the plane of the flap and engageable with a marginal edge of the vehicle seat to yieldably maintain the receptacle positioned adjacent the seat front with a bottom marginal edge of the receptacle contacting the vehicle floor.

2. A refuse container as defined in claim 1 characterized in that an integral foot support depends from the lower marginal edge of the receptacle opposite the edge to which said flap is joined, said foot support adapted to frictionally engage the vehicle floor for preventing unintentional dislodgement of the refuse container from its position adjacent the vehicle seat.

3. A refuse container as defined in claim 1 characterized in that said flap member exhibits a plurality of projections spaced apart in a direction leading away from the junction of the flap with the receptacle, each projection having a free marginal edge portion adapted to releasably engage a marginal edge portion on the underside of the vehicle seat.

4. A refuse container as defined in claim 1 characterized in that said flap member has a pair of upstanding flange portions on the marginal edges thereof adjacent the juncture with the receptacle, each flange exhibiting a plurality of serrations spaced therealong each having an edge portion adapted to engage the marginal edge on the underside of the vehicle seat to releasably retain the refuse container in position with respect to said seat.

5. A refuse container to be positioned on the floor of a motor vehicle body immediately adjacent the front edge portion of a vehicle seat, comprising a box-like receptacle of generally rectangular shape having opposed pairs of side walls and a bottom wall and open at the top, flap member integral with the box and connected thereto along a lower marginal edge of a sidewall of the box by a flexible hinge-like connection biasing the flap toward said box side wall, said flap member exhibiting a plurality of integral projections displaced from the plane of the flap and each provided with a marginal edge portion facing said hinge-like connection for releasable engagement with a marginal edge on the underside of a vehicle seat when the flap member is inserted under the seat, and an integral, relatively rigid foot-like support joined to the box along the lower marginal edge thereof opposite the connection between the flap and said box and extending generally downwardly away from the box, said support adapted to frictionally engage the vehicle floor when the flap profections are engaged with the vehicle seat for retaining the container against movement in the vehicle.

References Cited

UNITED STATES PATENTS

| 1,678,375 | 7/1928 | Berssenbrugge. | |
| 2,008,372 | 7/1935 | Tipson | 224—29 |
| 2,639,848 | 5/1953 | Burmeister | 224—42.1 |
| 2,795,121 | 6/1957 | Pantello. | |
| 2,988,206 | 6/1961 | Olson. | |
| 3,104,040 | 9/1963 | Stevens | 224—29 |

GERALD M. FORLENZA, Primary Examiner

U.S. Cl. X.R.

224—42.42